Figure 1:
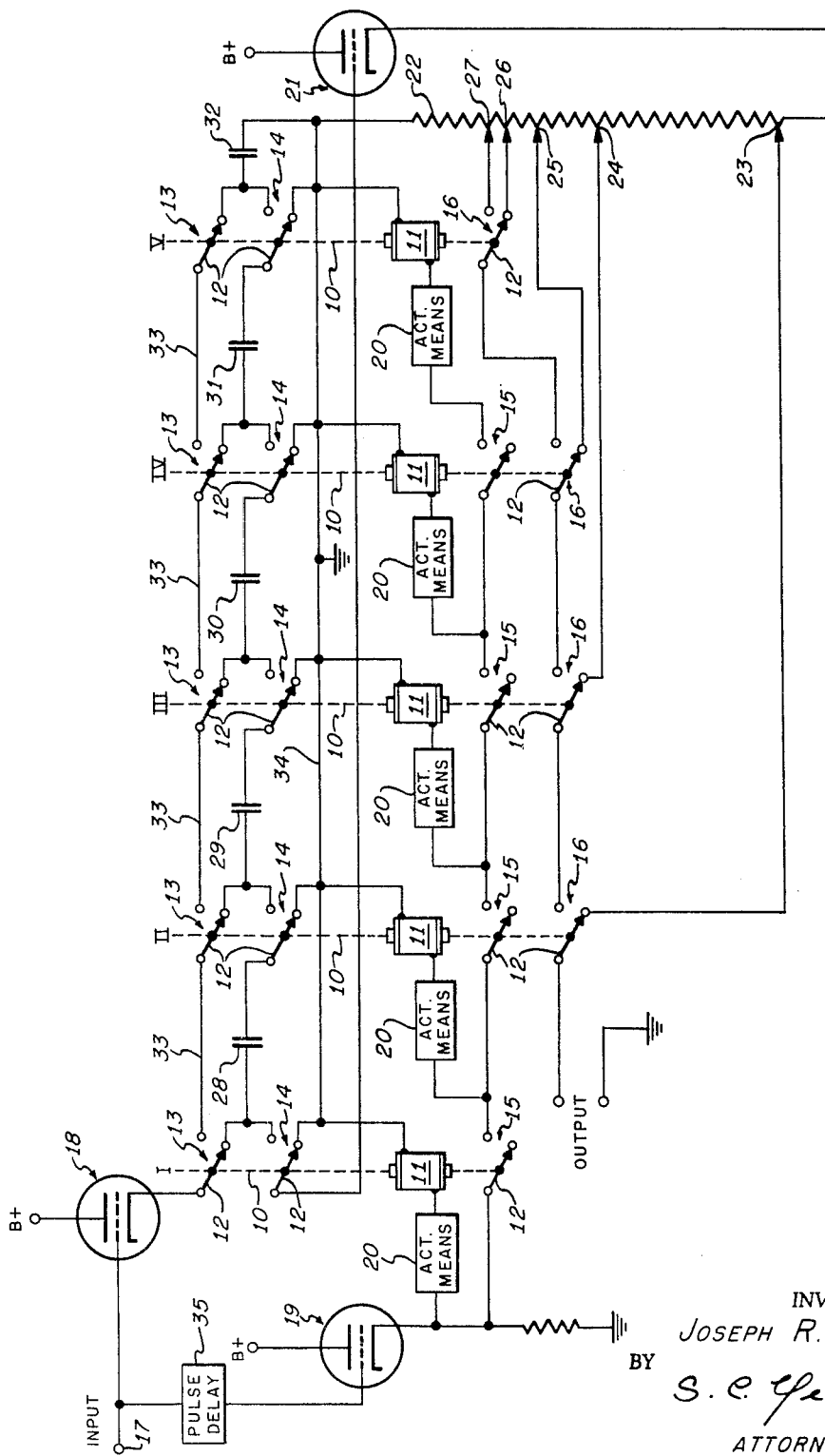

Feb. 2, 1965 — J. R. VADUS — 3,168,655
PULSE AVERAGING DEVICE
Filed April 20, 1962 — 2 Sheets-Sheet 2

INVENTOR.
JOSEPH R. VADUS
BY S. C. Yeaton
ATTORNEY

United States Patent Office 3,168,655
Patented Feb. 2, 1965

3,168,655
PULSE AVERAGING DEVICE
Joseph R. Vadus, Carle Place, N.Y., assignor to Sperry Rand Corporation, Great Neck, N.Y., a corporation of New York
Filed Apr. 20, 1962, Ser. No. 189,190
4 Claims. (Cl. 307—88.5)

This invention relates to pulse signal techniques and more particularly it concerns a means for obtaining information of a given nature from a group of voltage pulses.

In certain electronics applications it becomes necessary to ascertain the total or average value of a given characteristic in a group of pulses. Such a problem occurs for example, in stacked beam type radar systems where some aspect of target position (generally height) is represented by the relative amplitudes of echo pulses as received along one or more overlapping antenna beams. Because of atmospheric conditions, target fluctuations and irregularities in beam shape, the amplitudes of various echo pulses received from the same target may vary considerably from pulse to pulse. This prevents accurate interpolation between the overlapping beams and produces a poor representation of the elevation angle of the target. Accordingly, it is generally desired to provide some means for ascertaining the average relative heights of the pulses received in one or more adjacent beams.

Past methods for accomplishing these results have included both analog and digital techniques. The simplest analog system comprises a capictor with a unidirectional, and generally low impedance path from the source of pulses whose heights are to be averaged. The capacitor has a resistive discharge circuit across which the output or average voltage is taken. This analog system has the advantage of simplicity and reliability. However it is essentially a time dependent integrator circuit and thus gives only an approximate rather than a true indication of the arithmetic mean of pulse amplitude. Also, being time dependent, the circuit is sensitive to variations in pulse width and pulse repetition rate. The conventional digital techniques involve the production of a digital representation of amplitude for each pulse in the group. These representations are summed in a counter or adding means and the total is divided by the number of pulses. While this approach provides the true arithmetic mean of the pulse amplitudes, it suffers from undue complexity. Furthermore since each pulse in the group individually undergoes an analog to digital conversion a substantial total error could result, as where the amplitude of each pulse in the group is just under the threshold level required to produce the next higher digital representation. Another disadvantage of the digital approach is the difficulty with which a continuous or running average of pulse amplitudes can be presented during their occurrences. In general, an average height representation is available only after the entire group of pulses has occurred. Further limitations of both the purely analog and digital techniques are seen in the fact that pulses cannot be weighted prior to being averaged according to their relative position in a group. It may be that a given pulse, say the third in the group, is a test pulse and it is desired that this enter into the computation of average height by a preselected amount or not at all. Known devices for accomplishing this are generally very complex.

Consequently it is an object of this invention to provide a device which will sum the magnitudes of a given characteristic in a group of voltage pulses.

It is another object to produce a voltage representative of the average value of a given characteristic in a group of voltage pulses.

A further object is to provide a device capable of representing total or average pulse height or energy content in a group of voltage pulses irrespective of variations in pulse width or time occurrence.

Another object is to provide such a device which is capable of weighting the measured characteristic of each pulse by a known amount according to pulse position.

A still further object is to provide such a device wherein a continuous sum or average is produced during the occurrence of the group of pulses.

These and other objects are achieved through a unique combination which makes use of certain features of both the digital and the analog techniques. Generally speaking any mathematical computer has two fundamental aspects. They are programming and arithmetic calculation. In a certain sense the two aspects are intrinsically interrelated. In digital computers, for example, nearly all arithmetic units require programming to handle "carries," "remainders" and so forth. Likewise every arithmetic portion of an analog computer requires programming in the setting of parameters. In the more popular sense however, programming concerns which mathematical operations will be performed and in what order; while arithmetic calculation concerns the actual performance of these operations. This is the sense that the terms are intended to be used herein.

In the present invention a mathematical computer is provided which utilizes digital type programming and analog type arithmetic calculation. A digital type switching system is provided. This system is responsive to the occurrence and relative position of each pulse in the group to be averaged to direct the pulse to an individual capacitor element. Each capacitor element becomes charged, analog fashion, to a degree commensurate with the peak amplitude or total energy, of its assigned pulse. Further switching means are provided which are responsive to the occurrence of a charge on individual capacitors to connect those capacitors in series. The analog sum of the charge on the series connected capacitors is taken at a pair of output terminals or may be used to drive a proportional amount of current through a voltage divider resistance network to produce a voltage representation of the average charge on the capacitors. Still further switching means may be provided to adjust the voltage divider output in accordance with the number of charged capacitors.

A preferred embodiment of the present invention is shown in FIG. 1. This embodiment provides for the continuous indication of average pulse amplitude for the pulses which have occurred as they occur. Although the system shown is capable of averaging a group of only five pulses, it will be seen that its capacity may be increased to accommodate groups of any reasonable number of pulses merely by adding additional similar components in the manner to be indicated.

The embodiment is seen to include five banks (I–V) of relay type bistable switches. The switches in each bank are connected to a common armature 10 which is activated by means of an associated solenoid 11. The movable contact 12 of each switch in every bank is normally in its lowermost position as shown and remains there until its associated solenoid causes it to move to its upper position, where it stays until the remaining pulses in the group have occurred.

Each switch bank includes a pulse distribution switch 13 and a summing switch 14. All but the last bank include a solenoid activating switch 15, and all but the first band include a voltage divider output switch 16.

An input terminal 17 is connected to the grid of a pulse input triode 18 and through a pulse delay circuit 35 to the grid of a switching triode 19. The anodes of these two triodes are connected to sources of positive potential (not shown). The cathode of the pulse input triode 18 is connected to the movable contact of the pulse distribution swich 13 in the first bank I. The cathode of the switching triode 19 is connected to the movable contact of the solenoid activating switch 15 in the first bank and through a solenoid actuating means 20 to the solenoid 11 of the first bank. The movable contact of the summing switch 14 in the first bank is connected to the grid of an output triode 21. The anode of this triode is also connected to a source of positive potential (not shown). Its cathode is connected via a tapped resistor 22 to ground. A plurality of taps 23–27 are connected between selected points on the resistor and stationary contacts of divider output switches 16 in appropriate banks.

Capacitors 28–32 are provided between the banks of switches. The first plate of each capacitor is connected to opposite stationary terminals of the preceding pulse distribution 13 and pulse summing switch 14. Since the movable contacts of these two switches in any bank always move together, the first plate of each capacitor will always be electrically connected to the movable contact of one or the other switch. The remaining plate of each capacitor, except the last, is connected to the movable contact of the summing switch 14 in the next following bank. The remaining plate of the last capacitor 32 is permanently connected to ground.

Pulse distribution line segments 33 are connected between the remaining stationary contact of each pulse distribution switch and the movable contact of its next subsequent pulse distribution switch. A common ground line 34 is provided and is connected to the remaining stationary contact in each summing switch.

One end of each solenoid 11 is connected to the common ground line 14. The remaining ends of all but the first solenoid are connected through respective solenoid actuating circuits 20 to one stationary contact of their next preceding solenoid activating switch 15. This same stationary contact on each solenoid activating switch is also connected to the movable contact of its next subsequent solenoid activating switch. The remaining end of the first solenoid 11 is connected through an associated actuating means 20 to the cathode of the switching triode 19.

Each divider output switch 16 has one stationary contact connected via an associated tap to an appropriate point on the output triode resistor 22. For purposes of the present embodiment these points have been chosen to sense respectively, one fifth, one fourth, one third, one half and all of the total voltage drop across the resistor. The remaining stationary contact of each divider output switch is connected to the movable contact of the divider output switch in the next subsequent bank for all but the last bank V. In this case the remaining stationary contact is itself connected to a further point 27 on the output resistor 22.

Operation of the system, as has been indicated, involves both analog and digital aspects. The programming or order of operation is carried out in digital fashion, i.e., in response to occurrence and relative position of each pulse, and the arithmetic operation is carried out in analog fashion i.e. in response to pulse amplitude. Input pulses to be averaged are applied sequentially to the input terminal 17. They are amplified and converted to current surges in the cathode circuits of both the switching triode 19 and the pulse input triode 18. Current from the pulse input triode charges the first capacitor 28 which is connected between the cathode of the triode and ground through the pulse distribution switch 13 in the first bank and the summing switch 14 in the second bank. The first capacitor thus attains a voltage which bears an analog relation to the amplitude of the first input pulse.

Meanwhile the input signal supplied to the switching triode is impeded by the pulse delay circuit 35 for a time sufficient to permit the first capacitor to acquire its charge. After this time delay the first solenoid 11 becomes activated in response to the occurrence of the first pulse, causing the common armature 10 of the first bank to move to its upper position and changing the movable contact of every switch in the first bank to its upper position. This programs the system first, by connecting the now charged first capacitor 28 between ground and the grid of the output triode 21, second by connecting the second capacitor 29 between ground and the cathode of the pulse input triode 18, and third by connecting the solenoid 11 and associated actuating means 20 of the second bank to the cathode of the switching triode 19. As a result the voltage across the first capacitor is applied to the grid of the output triode, permitting a proportional current flow through its cathode connected output resistance 22.

The entire voltage drop across the output resistor, which is proportional to the amplitude of the input pulse, is taken through the first tap and appears at the output terminal.

Since the average height of a single pulse is the height of the pulse itself, no arithmetic operations are performed as a result of the first pulse. The programming however permits an output reading beginning with this first pulse. Also, because of the programing, the second capacitor 29 is connected to be charged through the pulse input triode 18 according to the amplitude of the second input pulse, and the solenoid 11 in the second bank of switches is connected to be activated in response to, but a short time after, the occurrence of the second pulse.

The second pulse appearing at the input terminal will now cause the second capacitor to be charged in the same manner as the first capacitor was charged by the first pulse. A short time thereafter the second solenoid is activated and the movable contacts in the entire second bank of switches are moved to their upper positions. This reprograms the device, connecting the first and second capacitors in series between ground and the grid of the output triode, and connecting the output terminal to the one-half voltage tap 24 on the output resistor. Also the pulse distribution switch 13 in the second bank is set to direct the third input pulse to the third capacitor 30. As a result of this reprograming an analog summing is achieved since the first two capacitors are connected in series between ground and the grid of the output triode. An analog division is also performed since the second output tap is connected between the output terminal and a point on the output resistance which is at one half the total drop across the resistor.

For each subsequent pulse there is a similar capacitor charging, switch activation and programming and summation and division, so that a continuous averaging is achieved as each pulse in the group occurs.

While the mechanical type switching in the embodiment of FIG. 1 provides positive action and thereby ensures against capacitor leakage during operation of the apparatus, the mechanical friction and inertia inherent in the movable contacts place an upper limit on the pulse repetition rate with which the device may be used. On the other hand an increased pulse repetition rate, at least for a group having the same number of pulses, contemplates a shorter storage time and consequently relaxes the requirements of freedom from capacitor leakage to a certain extent. Thus for higher pulse repetition rates the faster responding although somewhat less positive acting transistor type switching elements may be used.

Figure 2:
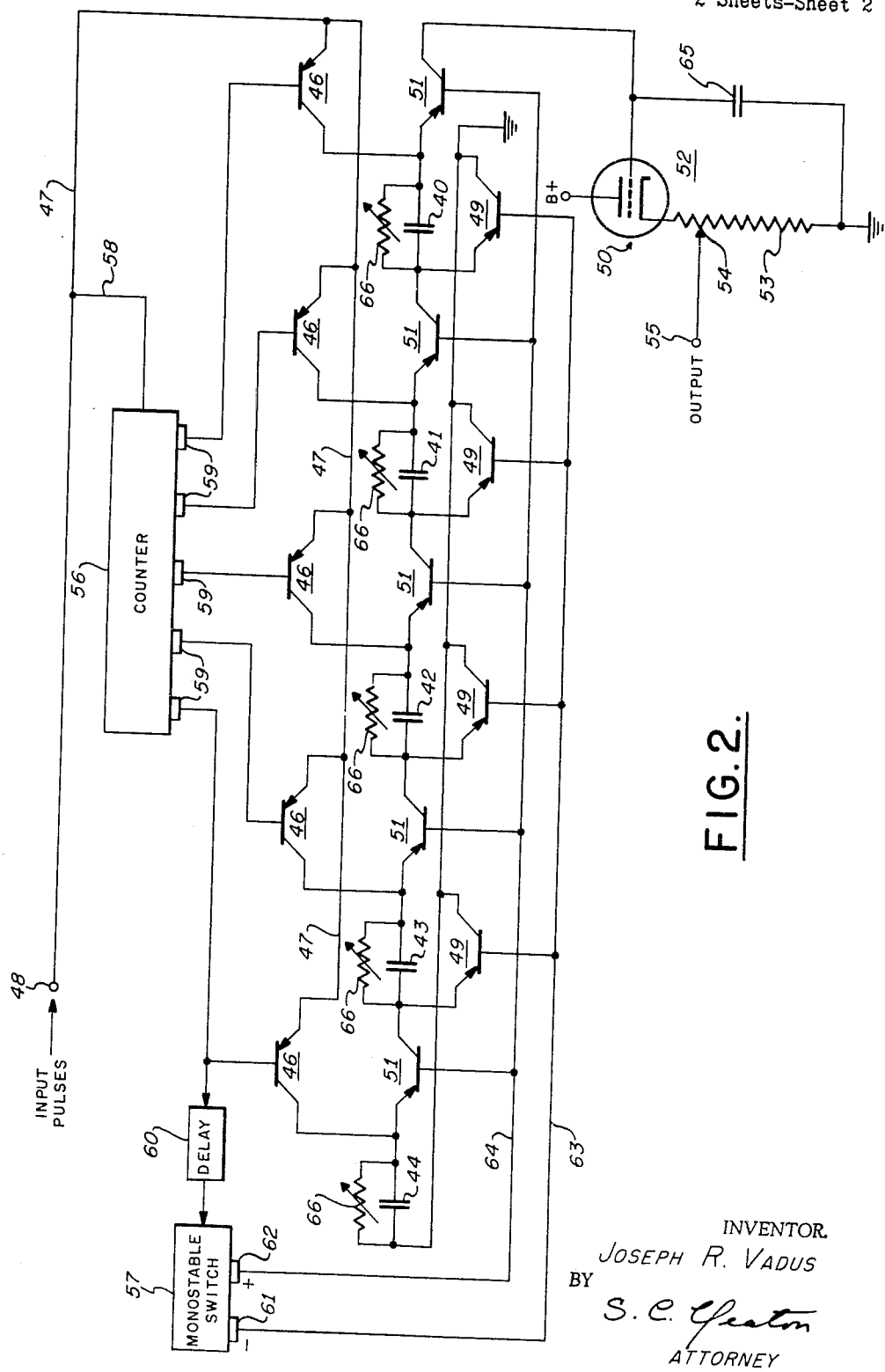

A system utilizing transistor switching is shown in the embodiment of FIG. 2. It will be noted that this embodiment provides an output indication only after the completion of a group of pulses and not during the occurrence of the individual pulses as in the embodiment of FIG. 1. It is to be recognized however, that FIG. 2 is provided primarily as an illustration of the application of semiconductor type switches to the present invention, and that the system shown may easily be adapted to perform the operations of the first embodiment by one skilled in the art.

As in the first embodiment the embodiment of FIG. 2 is comprised of both an analogue type arithmetic portion and a digital type programing portion. The arithmetic portion includes a series of capacitors, 40–44. The first plate of each capacitor is connected through the collector-emitter electrodes of an associated transistor type pulse distribution switch 46 to a common input line 47. The common input line is connected to an input terminal 48 from which it receives pulses to be averaged. The second plate of all but the last capacitor 44, is connected through the emitter-collector electrodes of an associated transistor type ground switch 49 to a common ground line. The second plate of the last capacitor is permanently connected to ground as shown. The capacitors are further adapted to be connected in series between ground and the grid of an output triode 50 by means of interspersed transistor summing switches 51.

The arithmetic portion of the system also includes a cathode coupled voltage divider circuit 52 associated with the output triode 50. The voltage divider circuit comprises a resistor 53 connected in series with the cathode of the output triode and a tap 54 arranged to pick off a fraction of the total voltage across the resistor. In the present case since the capacity of the device is five pulses, the tap would be set to pick off one fifth the total voltage drop across the resistor. This voltage appears at an output terminal 55 connected to the tap.

The digital programing portion of the device selectively activates the transistor switches in response to input pulses, so that the capacitors are charged, summed, and their charges averaged in proper order. The digital portion includes a counter circuit 56 and a monostable switch activating circuit 57. The counter circuit receives pulses from the common input line 47 via a connecting lead 58, and generates a negative potential on a different one of a number of output terminals 59 during the occurrence of each input pulse. Each output terminal is connected to the base electrode of an associated transistor pulse distribution switch 46.

The monostable switch activating circuit receives signals via a delay means 60 from the last output terminal of the counter circuit 56 at a short time after the occurrence of the last pulse in each group. The monostable switching activating circuit itself has first and second output terminals 61 and 62 which when at the quiescent state are at negative and positive potentials respectively. The first output terminal 61 is connected via a first common line 63 to the base electrode of each of the transistor ground switches. The second output terminal is connected via a second common line 64 to the base electrode of each of the interspersed transistor switches 49.

The embodiment of FIG. 2 operates in the following manner. Initially all of the output terminals 59 of the counter circuit 56 are at positive potential thus maintaining the pulse distribution switches 46 in their nonconductive state and effectively isolating all of the capacitors from the common input line 47. Also the transistor summing switches 51 are maintained in a non-conductive state by reason of the positive potential supplied to their base electrodes from the second output terminal 62 of the monostable switch activating circuit 57. The transistor ground switches 49 however, whose base electrodes are connected to the negative terminal 61 of the switch activating circuit, and are maintained in a conductive state, thus connecting the second plate of each capacitor to ground.

As each input pulse appears on the common input line a different one of the output terminals of the counter circuit receives a negative potential. This renders an associated pulse distribtuion switch conductive, thus connecting a corresponding capacitor to the common input line. In this manner each capacitor becomes charged by an amount commensurate with the amplitude of a corresponding input pulse.

A short time after the occurrence of the last pulse in the group, the monostable switch activating circuit receives a signal from the delay means 60 and is converted to its activated state thus reversing the potentials on its output terminals. As a result the base electrodes of the transistor ground switches receive a positive potential rendering the transistors non-conductive. At the same time, the base electrodes of the transistor summing switches receive a negative potenial and these transistors are rendered conductive. This connects the capacitors in series between ground and the grid of the output triode which as in the first embodiment permits a current proportional to the total voltage across the capacitors to pass through the cathode connector resistor. The voltage appearing at the output terminal 55 is then proportional to the average voltage across each of the capacitors.

The monostable switch activating circuit remains in its activated state for a relatively short period of time after which it reverts to its quiescent state to ready the device for a new group of pulses. In order to maintain a continuous output indication of the average value of the previous pulse group during the occurrence of the next subsequent group, a capacitor 65 is provided between ground and the grid of the output triode. The capacitor is of sufficiently small to size to have insignificant effect upon the total voltage supplied the other capacitors, yet is of sufficient size to maintain grid potential for a certain length of time after the switch activating circuit has reverted to its quiescent state.

As has been indicated, semiconductor type switching devices do not possess the same degree of positive switching action as do their mechanical counterparts. For certain applications therefore it may be desired to compensate for the error caused by leakage which may take place through them. The present embodiment accomplishes this by the provision of adjustable resistances 66 connected across each capacitor. These resistances are adjusted in accordance with the expected pulse repetition rate so as to permit the last charged capacitor to discharge a certain amount to compensate for the inherent leakage from the capacitor which was charged from the first pulse. In this manner a programmed type weighting of each capacitor may be effected. Since the presence of these resistors will affect the output voltage is may be necessary to calibrate the device such as by adjusting the gain of the output triode.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A device for providing a continuous indication of total pulse amplitude during the occurrence of successively applied input pulses, said device comprising a pair of input terminals and a pair of output terminals, a plurality of switch banks arranged in order, each switch bank including a bistable single pole double throw pulse distribution switch and a bistable single pole double throw summing switch, an individual terminal of each summing switch being connected to one of said input terminals and to one of said output terminals, the pulse distribution switches being connected to form, when in a first state, a continuous line from the other of said input terminals, a plurality of capacitors, each capacitor being associated with a different switch bank and having one plate connected to an individual terminal of both the pulse distribution switch and the summing switch in its respective bank, each capacitor having its remaining side connected to the common terminal of the summing switch in its next successive bank, the summing switches being arranged to connect, when in a first state, each capacitor in series between said output terminals, a switch actuating means responsive to the occurrence of each pulse at said input terminals to throw the switches in each bank successively from their second to their first state after the occurrence of said pulse.

2. The device defined in claim 1 wherein all of said switches are of the relay type, the switches in each bank having movable contacts mounted on a common armature which is activated by an associated solenoid, the associated solenoids being adapted to receive a signal from said input terminals after the occurrence of each input voltage pulse.

3. The device defined in claim 2 further including a relay type solenoid actuating switch associated with each bank, each solenoid actuating switch being operative in its first state to connect the solenoid associated with the next successive bank.

4. A device for producing an output signal representing continuously the average amplitude of a succession of input pulses, said device comprising a plurality of capacitors equalling the number of said input pulses, a plurality of first switching means coupled to receive said input pulses for applying each said input pulse to a respective one of said capacitors, each said first switching means being actuated in response to a respective one of said input pulses, an impedance means having a plurality of taps equalling said number of input pulses, a plurality of second switching means coupled to receive said input pulses for connecting respective ones of said capacitors in series circuit with each other across said impedance means, each said second switching means being actuated in response to a respective one of said input pulses, an output terminal, and a plurality of third switching means coupled to receive said input pulses for sequentially connecting said output terminal to each of said taps, each said third switching means being actuated in response to a respective one of said input pulses.

References Cited in the file of this patent

UNITED STATES PATENTS

| | | |
|---|---|---|
| 1,734,917 | Peek | Nov. 5, 1929 |
| 2,336,376 | Tandler et al. | Dec. 7, 1943 |
| 2,600,648 | Herrick | June 17, 1952 |
| 2,708,257 | Bedford | May 10, 1955 |
| 2,920,193 | Breckman | Jan. 5, 1960 |